United States Patent [19]

Terasawa

[11] Patent Number: 4,506,277

[45] Date of Patent: Mar. 19, 1985

[54] NOZZLE-RESTORING SUCTION DEVICE FOR INK JET PRINTER

[75] Inventor: Koji Terasawa, Mitaka, Japan

[73] Assignee: Canon Kabushiki Kaisha, Tokyo, Japan

[21] Appl. No.: 490,160

[22] Filed: Apr. 29, 1983

[30] Foreign Application Priority Data

May 11, 1982 [JP] Japan .................................. 57-79403

[51] Int. Cl.3 .............................................. G01D 15/18

[52] U.S. Cl. ................................................ 346/140 R

[58] Field of Search ......................................... 346/140

[56] References Cited

U.S. PATENT DOCUMENTS

| | | | |
|---|---|---|---|
| 4,340,897 | 7/1982 | Miller | 346/140 |
| 4,383,263 | 5/1983 | Ozawa | 346/140 |
| 4,394,669 | 7/1983 | Ozawa | 346/140 |
| 4,403,233 | 9/1983 | Terasawa | 346/140 |

*Primary Examiner*—Joseph W. Hartary
*Attorney, Agent, or Firm*—Fitzpatrick, Cella, Harper & Scinto

[57] ABSTRACT

This invention provides a nozzle-restoring suction device provided with a suction unit for generating a negative pressure, a capping unit provided with closing caps for tightly closing respective nozzles formed on a recording head, and a connection unit for connecting the suction unit with the capping unit for enabling suction of the front ends of the nozzles by means of the negative pressure generated in the suction unit.

6 Claims, 4 Drawing Figures

NOZZLE-RESTORING SUCTION DEVICE FOR INK JET PRINTER

BACKGROUND OF THE INVENTION

1. Field of the Invention

The present invention relates to a nozzle-restoring suction device, for use in an ink jet printer for emitting inks of plural colors from plural nozzles each of which emits at least ink of a single color, for closing the front ends of said nozzles and restoring the nozzles by suction.

2. Description of the Prior Art

The elastic cap of the nozzle-restoring suction device conventionally employed in the ink jet printer is used not only for closing the front ends of nozzles but also for causing suction in the front ends when necessary in cooperation with a suction mechanism. Such a nozzle-restoring suction device should be capable of effecting efficient suction of the front ends of the nozzles.

However, such a nozzle-restoring device produces mixing of inks in case of suction from plural nozzles which are for emitting inks of different colors, and is therefore associated with the drawback, if it is left in this state, of giving rise to color mixing by diffusion of the inks in the nozzles.

SUMMARY OF THE INVENTION

An object of the present invention is to provide a nozzle-restoring suction device capable of efficient suction of the front ends of the nozzles.

Another object of the present invention is to provide a nozzle-restoring suction device not causing the mixing of inks.

Still another object of the present invention is to provide a nozzle-restoring suction device with a simplified structure.

Still another object of the present invention is to provide a nozzle-restoring suction device allowing easier and inexpensive manufacture.

Still other objects of the present invention will become apparent from the following description.

BRIEF DESCRIPTION OF THE DRAWINGS

FIGS. 1 and 2 illustrate an embodiment of the present invention wherein FIG. 1 is a schematic perspective view thereof and FIG. 2 is a cross-sectional view of an elastic cap employed therein;

FIGS. 3 and 4 illustrate another embodiment wherein FIG. 3 is a schematic perspective view and FIG. 4 is a cross-sectional view of an elastic cap employed therein.

DETAILED DESCRIPTION OF THE PREFERRED EMBODIMENTS

Figure 1:
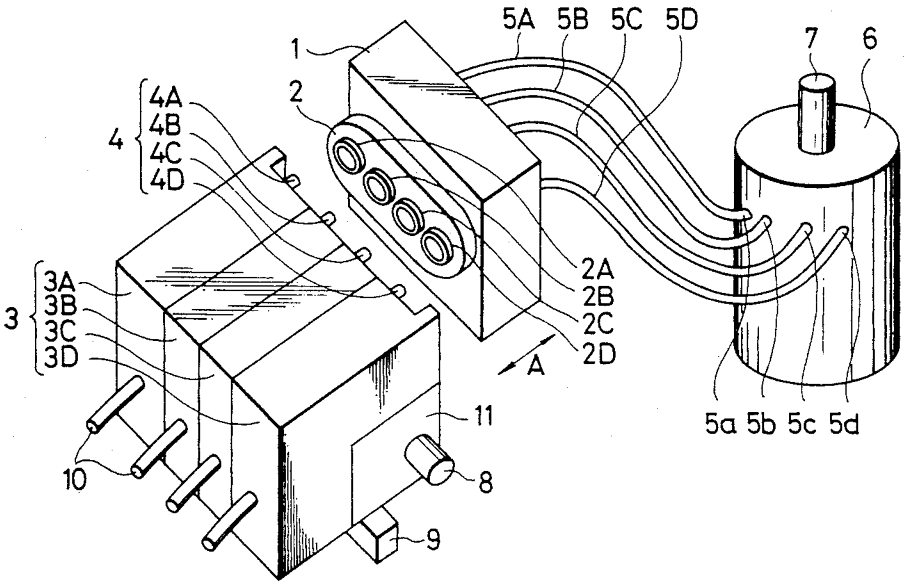
Figure 2:
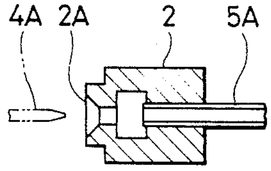

FIG. 1 shows an embodiment of the present invention, wherein an elastic cap 2 composed of synthetic rubber and integrally fixed on a cap holder 1 is moved in a direction A to close the front ends of nozzles 4 provided in a sub-tank 3. The sub-tank 3, constituting a multi-color recording head, is supported on a carriage 11 and is displaced along a shaft 8 and a stay 9, wherein sub-tanks 3A, 3B, 3C, 3D respectively contain inks for example of black, cyan, magenta and yellow which are respectively emitted from nozzles 4A, 4B, 4C, 4D. Corresponding to the nozzles, the elastic cap 2 is provided with independent closing-sucking caps 2A, 2B, 2C, 2D which tightly close the nozzles and are connected to a piston-type vacuum source 6 through flexible tubes 5A, 5B, 5C, 5D. Said vacuum source any be replace by a vacuum pump driven with a motor. When vacuum is not generated in the vacuum source 6 by a piston 7, connections **5*a*, 5*b*, 5*c*, 5*d* between the flexible tubes and said vacuum source are closed inside the vacuum source, for example by means of piston rings provided therein. In the above-described structure, the restoration of a clogged nozzle is effected in the following manner. After the nozzles are tightly closed by the closing caps 2A–2D, vacuum is generated in the vacuum source, whereby the elastic cap 2 and the flexible tube 5A–5D are filled with inks sucked from the nozzles. The flexible tubes 5A–5D are closed at the aforementioned connections in the vacuum state, whereby the elastic cap and the flexible tubes 5A–5D inhale the inks of different colors until reaching atmospheric pressure, thereby avoiding the mixing of inks. The inks communicate, through supply pipes 10, with unrepresented main tanks maintained substantially at atmospheric pressure. FIG. 2 is a cross-sectional view of the closing cap 2A of the elastic cap 2 showing the connection of the flexible tube 5A to the nozzle 4A, and other closing caps 2B, 2C, 2D are structured in the same manner. The mixing of different inks can therefore be prevented completely by the use of the integral elastic cap 2 having independent closing caps 2A–2D, and of independent flexible tubes 5A–5D** not communicating with each other.

Figure 3:
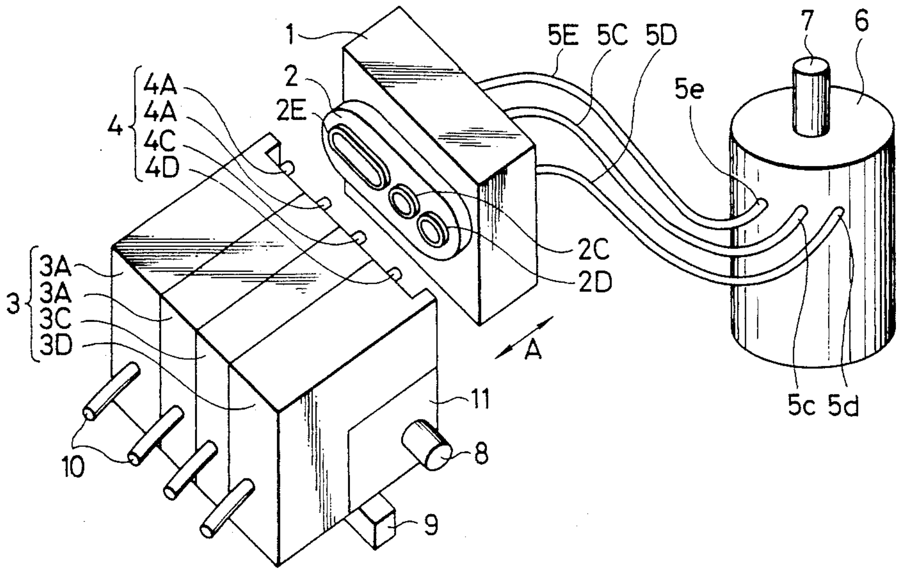
Figure 4:
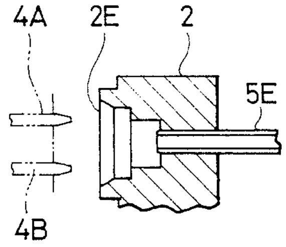

FIGS. 3 and 4 show another embodiment in which is provided a pair of sub-tanks 3A containing black ink, whose consumption is greater than that of the other inks. Corresponding to those sub-tanks 3A the elastic cap 2 is provided with an oval closing cap 2E for closing nozzles 4A, 4A of the paired sub-tanks 3A, 3A, and said closing cap 2E is connected to a suction tube 5E for black ink. In this manner the elastic cap 2 is provided with closing caps 2E, 2C, 2D for respective colors, instead of respective nozzles, and the closing caps are connected to suction tubes 5E, 5C, 5D. In this manner it is rendered possible to reduce the number of tubes and to simplify the entire structure.

The closing cans in the foregoing embodiments are formed in a common elastic cap but they may be formed in mutually independent elastic cap but they may be formed in mutually independent elastic caps. Also it will be apparent that the number of nozzles and of colors of inks are not necessarily limited to those shown in the foregoing embodiments.

As explained in the foregoing, the present invention enables one to provide a nozzle-restoring suction device capable of preventing ink mixing with a simplified structure.

What I claim is:

1. A nozzle-restoring suction device comprising:
suction means for generating a negative pressure;
capping means comprising independent closing caps corresponding to respective colors of emitting ink respectively provided for plural nozzles of a recording head which emits inks of plural colors for tightly closing the nozzles; and
connection means for connecting said suction means with said capping means for enabling suction from the front ends of the nozzles by the negative pressure of said suction means.

2. A nozzle-restoring suction device according to claim 1, wherein said connection means comprises independent tubes of a number corresponding to the number of said closing caps without mutual communication therebetween.

3. A nozzle-restoring suction device according to claim 1, wherein said closing caps are integrally formed by a rubber material.

4. A nozzle-restoring suction device comprising:

single suction means for generating a negative pressure;

capping means comprising a first closing cap tightly closing two or more nozzles which emit first color ink and a second closing cap tightly closing a single nozzle which emits second color ink different from said first color ink, corresponding to a recording head comprising plural nozzles; and connection means for connecting said suction means with said capping means for enabling suction from the front ends of the nozzles by the negative pressure of said suction means.

5. A nozzle-restoring suction device according to claim 4, wherein said connection means comprises independent tubes respectively corresponding to said first and second closing caps and being formed without mutual communication.

6. A nozzle-restoring suction device according to claim 4, wherein said first and second closing caps are integrally formed with a rubber material.

* * * * *